United States Patent [19]

Zobeli

[11] Patent Number: 4,653,361
[45] Date of Patent: Mar. 31, 1987

[54] MEASURING SYSTEM IN AN ANNULAR SLICING MACHINE

[75] Inventor: Armin Zobeli, Steffisburg, Switzerland

[73] Assignee: Meyer & Burger AG, Steffisburg, Switzerland

[21] Appl. No.: 747,224

[22] Filed: Jun. 21, 1985

[30] Foreign Application Priority Data

Jun. 27, 1984 [EP] European Pat. Off. ........ 84810317.2

[51] Int. Cl.$^4$ ...................... B24B 49/16; B23Q 17/09; B23Q 15/12; B28D 5/02
[52] U.S. Cl. .................................... 82/48; 51/165.77; 83/72; 83/74; 125/14
[58] Field of Search ..................... 82/2 B, 48; 125/14; 51/73 R, 165.77, 165.92; 83/72, 74

[56] References Cited

U.S. PATENT DOCUMENTS

| | | | |
|---|---|---|---|
| 3,702,043 | 11/1972 | Welbourn et al. | 51/165.77 |
| 3,796,012 | 3/1974 | Uhtenwoldt | 51/165.77 |
| 3,913,277 | 10/1975 | Hahn et al. | 51/165.77 |
| 3,967,515 | 7/1976 | Nochtigal et al. | 51/165.77 |
| 4,193,227 | 3/1980 | Uhtenwoldt | 51/165.77 |
| 4,228,782 | 10/1980 | Demers et al. | 125/14 |

FOREIGN PATENT DOCUMENTS 0139067 2/1985 European Pat. Off. .

Primary Examiner—Lowell A. Larson
Assistant Examiner—Jerry Kearns
Attorney, Agent, or Firm—Bernard, Rothwell & Brown

[57] ABSTRACT

The slicing machine has a mounting table carrying the workpiece to be sliced by the cutting blade. The mounting table is supported on an elastically deformable measuring plate of which the deformation is measured by a measuring transducer in a position as near as possible to the plane of the cutting blade wherein the cutting force is acting. The measuring transducer has very high sensitivity in order to detect deformations in the order of fractions of a μm and is thus able to properly detect the value of the cutting force. The measuring system is spaced from the cutting blade and workpiece and does not hinder manipulation and accurate fine adjustment of the workpiece. On the other hand the accuracy of the measurement does not depend on the manner in which the workpiece is mounted. Preferably deflection of the cutting blade from its plane under the influence of the cutting force is also detected and an optimum control and supervision of the cutting process may be effected based on both measurements. Means for fine adjustment may be provided between the mounting table and the measuring member.

20 Claims, 6 Drawing Figures

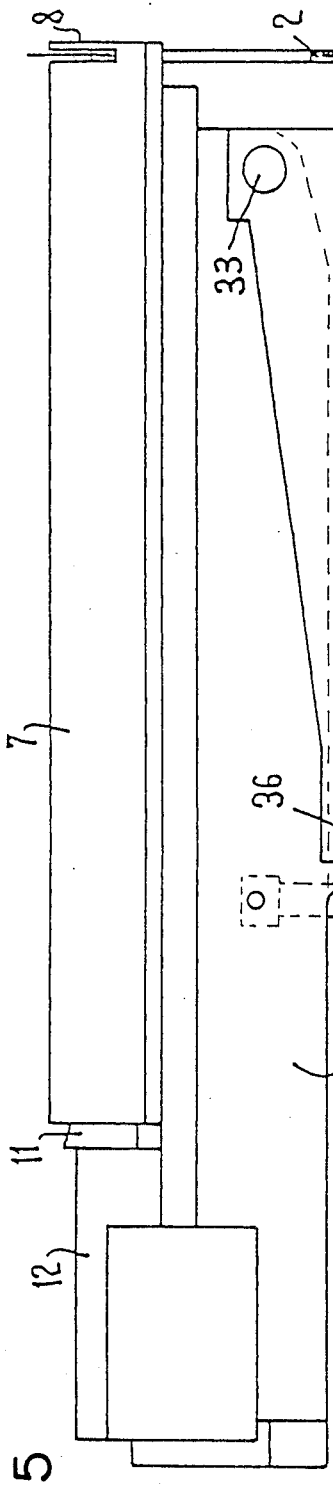
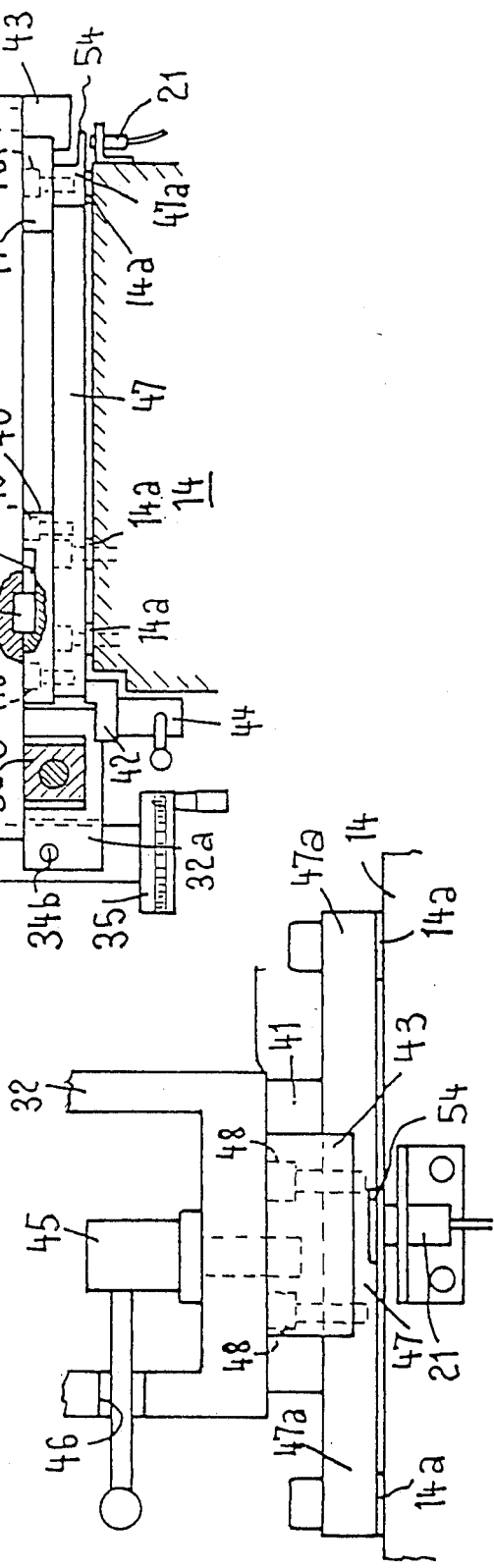
FIG.5
FIG.7

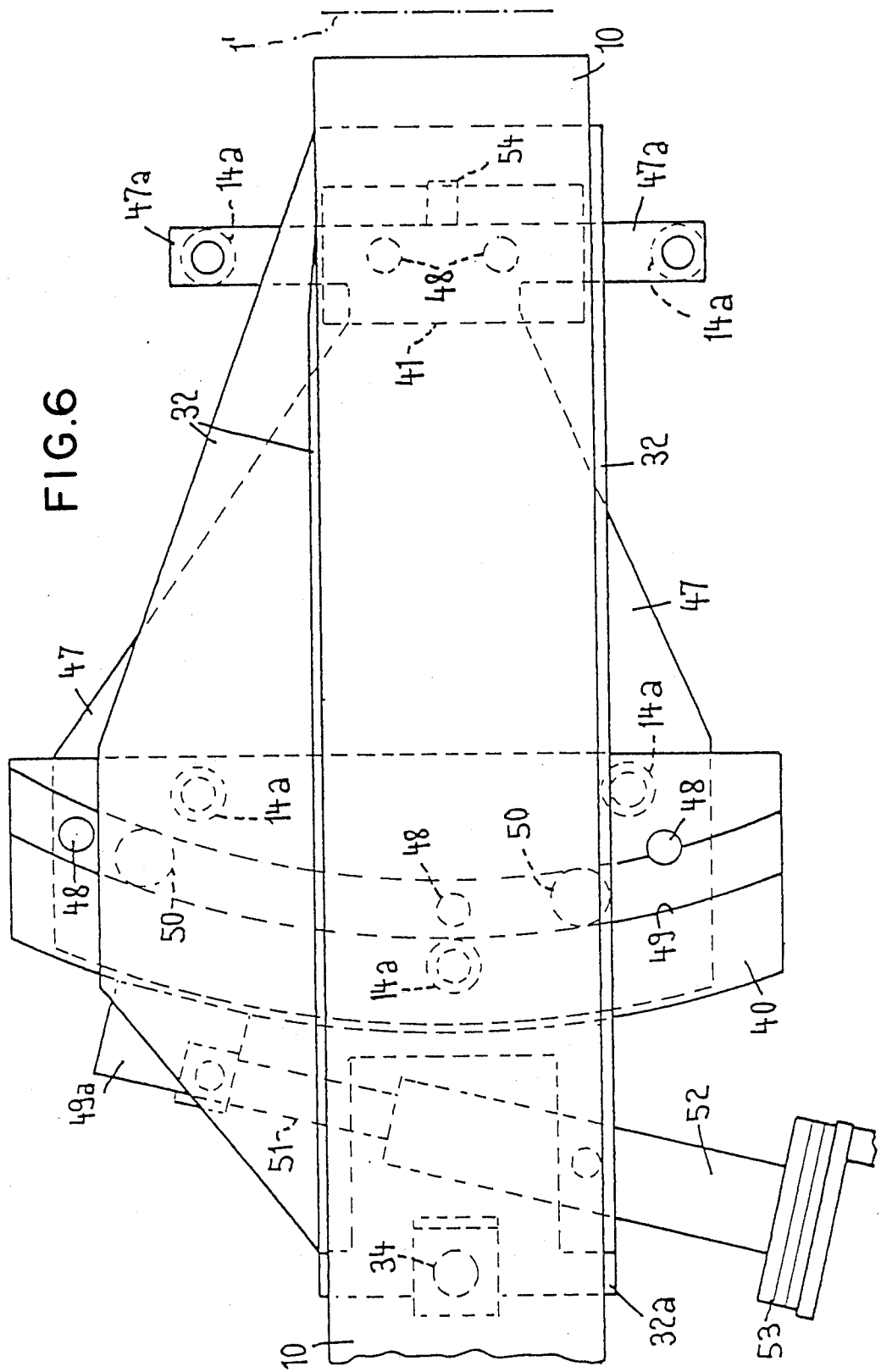

MEASURING SYSTEM IN AN ANNULAR SLICING MACHINE

BACKGROUND OF THE INVENTION

The present invention relates to a measuring system in an annular slicing machine having an annular cutting blade, for detecting the cutting force exerted by said cutting blade onto a workpiece to be sliced during the cutting operation, the machine further having a mounting table, said workpiece being mounted on said mounting table displaceable in a direction transverse to the cutting direction, means for relative displacement of said mounting table and said cutting blade in the cutting direction for producing the cutting feed, and at least one measuring transducer for detecting the cutting force. Slicing machines of this kind are used for slicing brittle and hard materials such as semiconductor materials, for instance monocristalline silicon. They allow slicing with minimum cutting loss and at high precision regarding parallelity, evenness and thickness of the slices. However, in order to warrant such advantages a continuous supervision of the cutting process with a suitable and reliable measuring systems is required. As an example, it is usual to detect the deflection of the cutting blade from its plane and to take measures, particularly to tension and /or to dress the cutting blade if the detected deformation exceeds predetermined limit values (EP-A-0 139 067).

It is usual to measure the cutting force excerted by the cutting blade onto the workpiece to be sliced and to control the cutting feed and/or to dress the cutting blade in accordance with the measured value of the cutting force. U.S. Pat. No. 4,228,782 discloses systems for detecting the cutting force. In one of the disclosed embodiments the rod to be sliced together with a supporting bar is fixed with one end thereof in cantilever relation to a support. A measuring transducer is mounted between this fixed end of the rod and said support which is displaceable in the direction of the rod axis. In this case it is difficult to obtain sufficiently stable support of the workpiece. Since the distance of the cutting place from the measuring transducer decreases when succeeding cutting operations are carried out, new calibration of the measuring system would be necessary for each cutting operation, if strictly comparable conditions should be wanted for each cutting operation, this calibration taking into consideration the momentary distance between the cutting place and the transducer. For these reasons rods of limited lenght only may be sliced by means of this prior system.

With another embodiment disclosed in U.S. Pat. No. 4,228,782 the measuring transducer is located in the plane of the cutting blade and the supporting bar onto which the rod to be sliced is cemented directly rests and slides on the transducer. The accuracy of such a measurement strongly depends on how the rod end is clamped to its carrying block, and it is very difficult, to alway reproduce similar conditions. Therefore, a new calibration is required whenever a new rod to be sliced has been mounted. Moreover an accurate measurement of the cutting forces requires a very accurate parallelity of the bottom surface of the supporting bar resting on the transducer with the advancing or feeding direction of the workpiece, and also absolute evenness of this surface. Since it is hardly possible to meet with both conditions at the same time, large tolerances regarding parallelity and thickness of the slices will result. Subject to the flexibility of the clamping of the workpiece to its support, there always exist variable influences onto the results of the measurement of the cutting force.

SUMMARY OF THE INVENTION

The object of this invention is to provide a simple measuring system which is not affected by rough ambient conditions and which does not limit the freedom of construction of the feed mechanism for the workpiece and clamping and supporting of the same. It is a further object to provide for free adjustment of the workpiece in a vertical and horizontal direction without affecting the measurement. This aims are achieved by providing a supporting structure between a carrying portion of the machine and said mounting table, and a measuring transducer disposed for detecting an elastic deformation depending on said cutting force within said supporting structure. Under these conditions the means for mounting the workpiece and the means for measurement of the cutting force are located in entirely separate areas of the machine, whereby continuous measurement, even with a 24 hour production, is possible without problems and with minimum qualification of the operating staff.

Preferably a separate measuring member which is elastically deformable in the direction of the cutting force is mounted between the mounting table and the carrying portion of the machine. This member may be formed for optimum measuring conditions.

It is a further object of the invention to include in said supporting structure means for fine adjustment of the mounting table relatively to said carrying portion, said means for fine adjustment being mounted between said transducer and said mounting table in order that fine adjustment of said mounting table and workpiece respectively does not affect measurement of said cutting force by said transducer.

It is another object of this invention to provide means for detecting the deflection of the cutting blade from its plane in addition to the measurement of the cutting force, and to control the cutting operation and/or to make and display a diagnosis based on both parameters, namely the cutting force and the deflection of the cutting blade. The combination of both measuring results allows extensive analysis particularly regarding the condition of the cutting blade, this allowing optimum control and maintenance.

This invention will now be explained in more detail by way of example with reference to an embodiment and modifications thereof illustrated in the accompanying drawing.

BRIEF DESCRIPTION OF THE DRAWINGS

FIG. 5 is an elevation of an embodiment including means for fine adjustment of the workpiece, FIG. 6 is as top view of the embodiment of FIG. 5 and FIG. 7 is a partial front view of the embodiment of FIG. 5.

DESCRIPTION OF THE PREFERRED EMBODIMENTS

Figure 1:
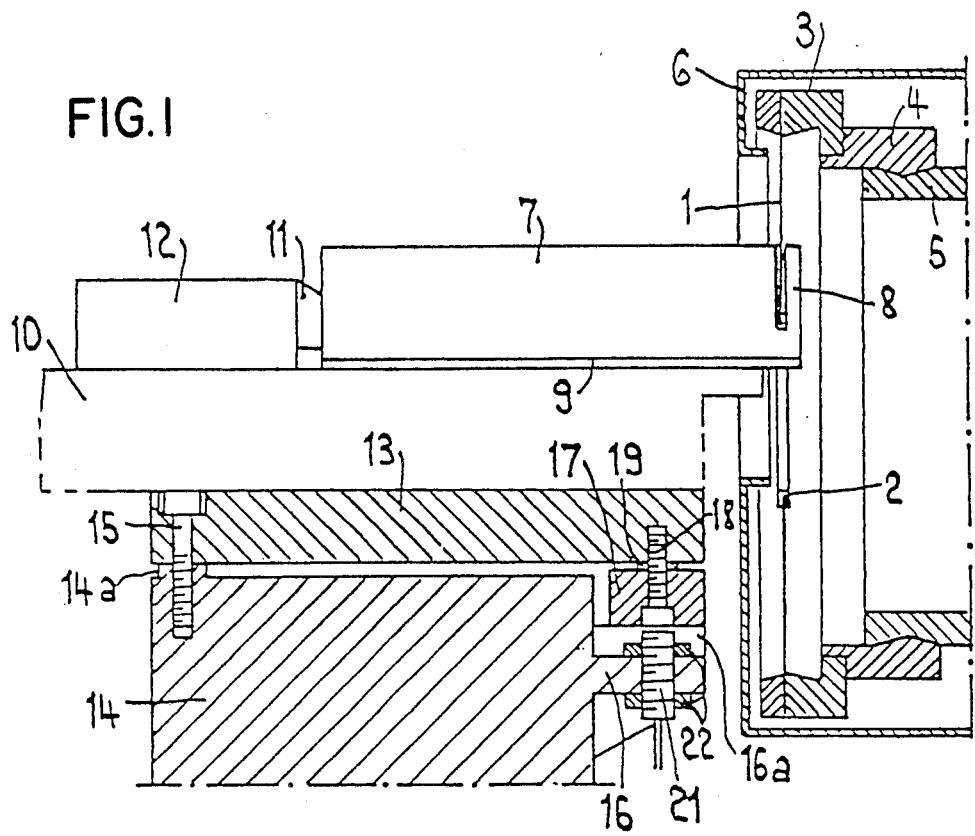
FIG. 1 is as vertical section of a first embodiment.

FIG. 1 shows the parts of importance for the cutting operation and measurement of the cutting force of an annular slicing machine. The annular cutting blade 1 has a diamond coating 2 at its inner edge, and it is clamped and tensioned in a two-part tension ring 3 in a manner not shown in detail and well known for instance from U.S. Pat. No. 3,762,008. This tension ring 3 is rotatably mounted by means of an aerostatic bearing having bearing rings 4 and 5, and it may be driven at a high speed by a motor not shown in the drawing. The cutting blade 1 and its bearing elements are located in a protecting housing 6.

As shown in FIG. 1, the cutting blade 1 has already partially entered into a rod-shaped workpiece 7 and has partially cut free one of the slices or wafers to be produced. The cutting blade excerts a cutting force F at the cutting place in the workpiece 7. The workpiece 7 is cemented to a supporting bar or cutting support 9. The workpiece 7 is also cemented to a plate 11 of a supporting block 12 by which the workpiece is fed after each cutting operation by one step to the right in FIG. 1 in order to bring it into to the position for effecting the next cutting operation. The workpiece supporting block 12 and the cutting support 9 rest on a mounting or guiding table 10. According to the kind of feeding system either the workpiece 7 or its supporting block 12 is clamped to the mounting table 10 during the cutting operation.

As illustrated in FIG. 1, the mounting block 10 is rigidly connected to a plate 13, but in fact adjusting means not shown in FIG. 1 but explained below, may be arranged between the mounting table 10 and the plate 13, in order to adjust the workpiece into a predetermined desired angular position relatively to the cutting blade.

The plate 13 is screwed by means of screws 15 to eyes 14a having accurately machined surfaces of a vertically displaceable slide 14 of the machine. The contacting surfaces of parts 13 and 14a and the screw forces are dimensioned for obtaining a predetermined high stability of the connection between parts 13 and 14. At its side facing the cutting blade 1 the slide 14 has a projecting flange 16 having raised bearings 16a at each end thereof. A measuring rod 17 rests on and extends between these bearings, the center portion of this measuring rod being fixed to the plate 13 by means of a screw 18. An intermediate plate 19 inserted between the rod 17 and the plate 13 accurately defines the contact area between parts 13 and 17. The measuring rod is also screw-fastened to the bearing 16a by means of screws 20. A measuring transducer 21 is inserted into a bore in the middle of flange 16, and it is locked in its position by means of nuts 22, such that its upper face is held at an appropriate distance from the measuring rod 17. Preferably a transducer adapted for contactless operation is used, for instance an eddy-current transducer connected to a measuring circuit including an oscillator for feeding the transducer 21 and an evaluating circuit, for instance a demodulator with amplifier and linearizing means. The output signal delivered by this measuring circuit is proportional to the cutting force F within determined limits. This cutting force is transmitted through the mounting table 10 to the plate 13 and causes a slight measurable deformation of this plate and the measuring rod which is connected to the plate 13. This deformation of the measuring rod 17 depending on the cutting force acts onto the measuring transducer 21 in a manner allowing sufficiently accurate measurement of the cutting force if adequate calibration is made. The output signal of the measuring circuit connected to the measuring transducer may be used for a digital or analogous display and for a registering instrument or for an evaluation for control or government of machine functions. The stiffness of the connection of the plate 13 to the slide 14, the stiffness of the measuring rod 17, the distance of the measuring rod and measuring transducer respectively from the connection of plate 13 to slide 14 and the position of all these parts relatively to the cutting plane are so dimensioned that for a cutting force of 10N in the plane of the cutting blade a deformation in the order of 0.1 to 0.6 $\mu$m, preferably of 0.4 $\mu$m occurs. If another measuring transducer, particularly a piezo-electric transducer is used in force-transmitting relation between relatively deformable parts of the machine, the deformation may be even smaller. The measuring place with rod 17 and transducer 21 is located as near as possible to the plane of the cutting blade. On the other hand, the connection between plate 12 and slide 14 is preferably located below the center of gravity of the machine parts and the workpiece supported on this connection. It has to be considered that in FIG. 1 the adjusting mechanism for the mounting table 10 is not shown. This mechanism is located mainly on the left side, so that the center of gravity of all parts supported by said connection is substantially vertically above this connection. In this case, the changes of bending stress occuring in the connection between plate 13 and slide 14 and the changes of bending stress acting onto the measuring rod 17 are caused to a substantial degree by the changes of the cutting force F, this being favourable for the accuracy and sensitivity of the measurement of the cutting force. Since the plate 13 is supported in three places, namely on the eyes 14a and on the measuring rod 17, a sufficiently high stability of the supporting structure for the mounting table 10 is obtained, so that neither static nor possible dynamic stresses which may occur during the cutting operation may induce displacements or vibrations of the workpiece resulting in a lower cutting quality. Nevertheless it is possible to obtain the said sensitivity of the measurement. Particularly, the system has a high strength in the plane perpendicular to the cutting force F, that is in the plane of plate 13 so that the forces acting parallely to this plane do not cause any relevant deformation. The resolution of measurement should be in the order of at least 0.1 $\mu$m.

The range of cutting forces to be measured is between about 3N and 100N, such that the linear measuring range of the measuring system should be in the order of 6 $\mu$m. The influences by the continuous change of the weight of the workpiece and the position of the workpiece respectively as well as temperature influences are eliminated by null-balancing of the measuinrg circuit prior to the beginning of each cutting operation. In this case temperature influences during the cutting period of about 1 to 10 minutes are not measurable since the mass of the elements involved is relatively high and the measuring place is appreciably spaced from the cutting place which is heated during the cutting operation. Due to the changes in weight of the workpiece which do not exceed 50 to 60 kg, and to temperature influences the total measuring range should be in the order of 0.2 mm inorder that readjustment of the measuring transducer is unnecessary.

For calibration of the measuring system, a weight of for instance 10N may be suspended on the workpiece. The measuring instrument which has been balanced to null before, now indicates the measuring value of this weight. The sensitivity may now be adjusted such that the standard force of 10N produces a determined deflection of the instrument of for example 4 mm on a display. Recalibration of the system would for instance be necessary if the measuring member consisting of the plate 13, the measuring rod 17 and the screw connection of plate 13 to slide 14 are dismantled and assembled again. In this case the bending strength of the connection would most probably change, this necessitating recalibration.

Other measuring transducers may be used, for instance strain gauges applied to the measuring rod 17, or an inductive measuring transducer mounted in the flange 16 and detecting the distance between the measuring rod 17 and the measuring transducer in order to detect the bending of the measuring rod.

Figure 3:
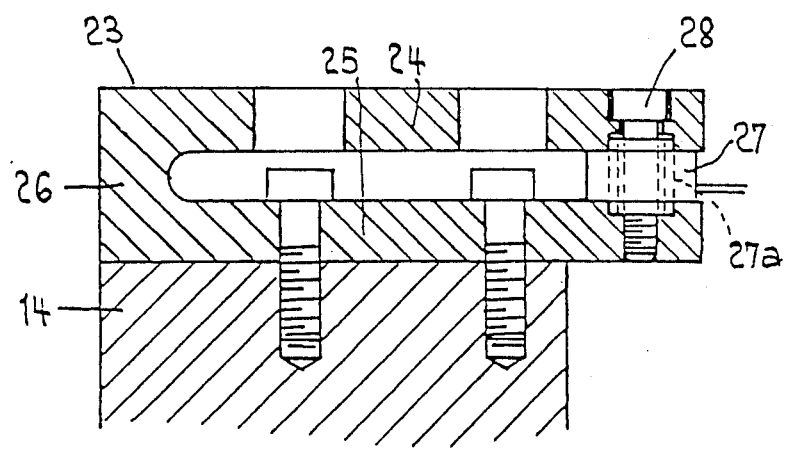
FIG. 3 schematically illustrates a first modification of the measuring member.

FIG. 3 shows a first modification of the measuring member of the machine. Instead of a plate 13 screwed to the slide 14, a measuring plate 23 in the shape of a tuning fork having plate-shaped legs 24 and 25 and a yoke 26 interconnecting the legs is provided. The lower leg 25 is screwed to the top of slide 14. The mounting table 10 is supported in a manner not shown in FIG. 3 to the upper leg of plate 23. A piezoelectric transducer 27 is inserted between the free ends of legs 24 and 25 without clearence, in force transmitting relationship and under a certain prestress. It is secured in this position by means of a centering sleeve 27a and prestressed by screw 28.

Possibilities of making use of the measurement of the cutting force have already been mentioned above. As an example, the vertical advance of slide 14 may be controlled in such a way that a constant cutting force or a cutting force varying in accordance with a predetermined function is obtained during each cutting operation. The measurement of the cutting force may also be used for supervision of the machine, whereby corrective measures are taken either manually or automatically if extremely high or low cutting forces are detected.

Figure 2:
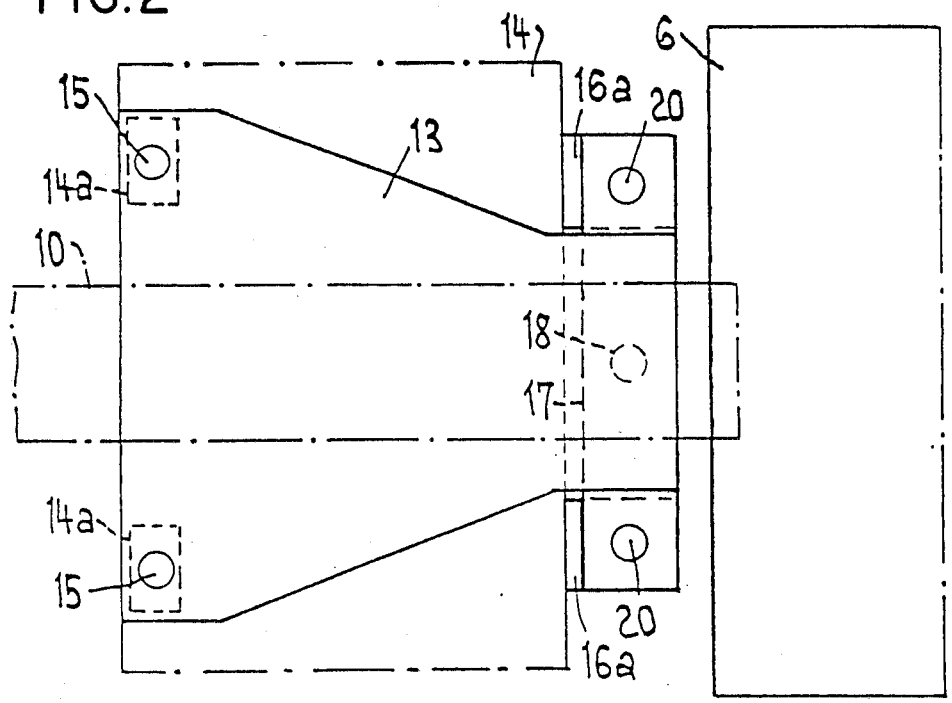
FIG. 2 shows a top view of the measuring member of the machine.
Figure 4:
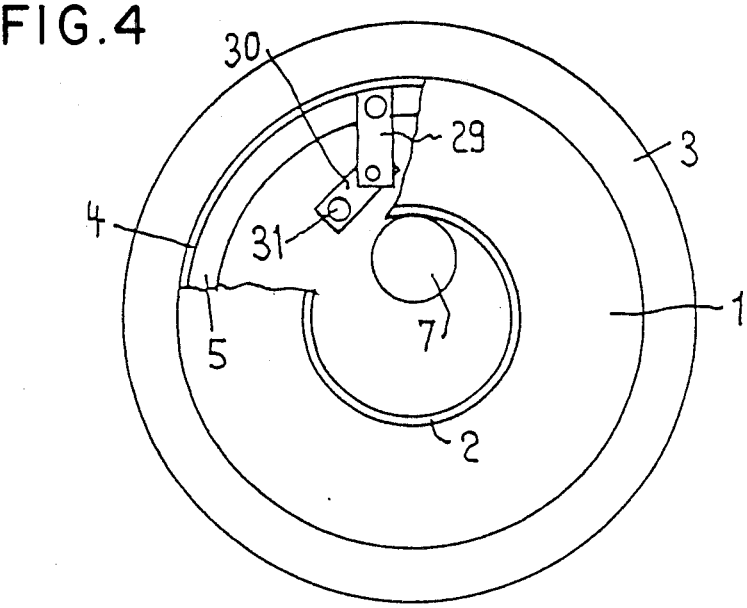
FIG. 4 shows a further modified embodiment.

A particularly favourable modification of the measuring system results if the measurement of the cutting force is combined with a measurement of the deflection of the cutting blade under the influence of the cutting force, in order to control the cutting process and/or to effect a diagnosis of the operation and condition of the machine and the cutting blade. In this case, similar measuring transducers may be used for both measurments, that is for measuring the bending of the measuring rod 17 or of the measuring member 23 and for detecting the deflection of the cutting blade 1, because at least parts of the measuring circuit may alternatively be used with the one or the other measuring transducer for measuring the cutting force and the blade deflection respectively. FIG. 4 illustrates more or less schematically an embodiment of a system for measuring the blade deflection, whereby similar parts are designated as in FIGS. 1 to 3. By means of brackets 29 and 30 the measuring transducer 31 which is similar to transducer 21, is mounted on bearing ring 5 and detects the distance of the cutting blade from transducer 31. A complete disclosure of a measuring device for detecting the deflection of the cutting blade is found in European Patent Application No. 0 139 067.

FIGS. 5 to 7 illustrate another embodiment including means for fine adjustment of the mounting table 10 relatively to its supporting structure. The force end of the mounting table 10 adjacent the cutting blade 1 or the plane 1' of the cutting blade respectively is pivotably mounted in a supporting bed 32 of U-shaped cross section (FIG. 7), by means of a bolt 33. This supporting bed 32 may be pivoted for fine adjustment of its inclination round bolt 33 within a limited range by means of a spindle 34 which may be displaced axially by a nut (not shown) rotatable within a sleeve 34a connected to downwardly extending frams 32a on bed 32 by means of a pin 34b, by means of a hand wheel 35. The bed 32 has a curved slit 36 in one of its vertical side flanges, and a threaded bolt 37 fixed on a lug 10a of the mounting table extends outwardly through this slit. By means of a nut 38 screwed onto said bolt 37 and having a hand lever 39, the mounting table may be clamped to its supporting bed in the desired position. The supporting bed 32 rests on two plates 40 and 41 to which it is usually camped by means of jaws 42 and 43 respectively, jaw 42 being tightened by means of a nut 44 with a hand lever and jaw 43 being tightened by means of a nut 45 seated in a recess 46 of bed 32. Plates 40 and 41 have the shape shown in FIG. 6 and are screw-fastened to a lower measuring plate 47 by means of several screws 48. Plate 40 has a circular groove 49 of which the center of curvature is in or near the plane 1' of the cutting blade. The supporting bed 32 has circular cams 50 fixed at its bottom side and engaging into groove 49 without clearence. If the jaws 42 and 43 are loosened, the supporting bed 32 together with the mounting table 10 may be angularly adjusted by a rotating movement guided by cams 50 engaging into groove 49. This horizontal fine adjustment may be controlled by means of a spindle 51 attached to a lug 40a of plate 40 and a nut rotatable within a sleeve 52 attached to a frame 32a, by means of a hand wheel 53.

As particularly seen from FIG. 6, the measuring plate 47 is generally V-shaped with two laterally extending arms 47a at its fore end adjacent the plane 1' of the cutting blade. As seen from FIG. 5, the ends of these arms 47a and the rear side of measuring plate 47 are screwed to eyes of the slide 14. Between these eyes the measuring plate is held with some clearance above the top surface of slide 14 and may thus be deformed under the forces acting thereon. Particularly, the arms 47a are bent more or less in accordance with an increase or decrease of the cutting force. A tongue 54 extending from the measuring plate 47 is facing the active end of a transducer 21 which may be of the type shown in FIGS. 1 to 3 and which is mounted in a bracket fixed to the slide 14. The transducer will produce a signal depending on its distance from tongue 54 and thus depending on the cutting force as explanined in connection with FIGS. 1 to 3. This measurement of the cutting force is not influenced by the means for fine adjustment of the mounting table 10 and workpiece 7 respectively.

If the cutting feed between the cutting blade and the workpiece is not obtained by an advance of the slide 14 of the machine but by an advance of the cutting blade, the elastically deformable measuring member may preferably be disposed between the mounting table 10 and a support rigidly fixed to the machine bed instead of slide 14, this support being stationary during the cutting operation. However, the measuring member may also be located between the bearing of the cutting blade and a slide carrying this bearing.

I claim:

1. A measuring system in an annular slicing machine having an annular cutting blade, for detecting the cutting force exerted by said cutting blade onto a workpiece to be sliced during the cutting operation, comprising a mounting table for cooperating with a rotating cutting blade to cut a workpiece, the mounting table and the cutting blade being mounted on a carrying portion of the machine, said workpiece being mounted on said mounting table for displacement in a direction transverse to the cutting direction, means for relative displacement of said mounting table and said cutting balde in the cutting direction for producing the cutting feed, a supporting structure rigidly mounted between a carrying portion of the machine and said mounting table, and a measuring transducer disposed for detecting an elastic deformation depending on said cutting force within said supporting structure.

2. A measuring system according to claim 1, wherein a separate measuring member elastically deformable in the direction of the cutting force is mounted between the mounting table and said carrying portion of the machine.

3. A measuring system in an annular slicing machine having an annular cutting blade, for detecting the cutting force excerted by said cutting blade onto a workpiece to be sliced during the cutting operation, a mounting table displaceable in a direction transverse to the cutting direction, said workpiece being mounted on said mounting table, means for relative displacement of said mounting table and said cutting blade in the cutting direction for producing the cutting feed, a supporting structure mounted between a carrying portion of the machine and said mounting table, and a measuring transducer disposed for detecting an elastic deformation depending on said cutting force within said supporting structure, said mounting structure including means for fine adjustment of said mounting table relatively to said carrying portion, said means for fine adjustment being mounted between said transducer and said mounting table in order that fine adjustment of said mounting table and workpiece respectively does not affect measurement of said cutting force by said transducer.

4. A measuring system according to claim 2 or 3, wherein said supporting structure is a cantilever plate fixed with one rim thereof to said carrying member, this plate having appropriate elasticity in the direction of said cutting force, but having high rigidity in a plane perpendicular to the direction of the cutting force.

5. A measuring system according to claim 4, wherein the free rim of said plate or flat element rests on a measuring rod, this measuring rod cooperating with said transducer.

6. A measuring system according to claim 4, wherein the free side of said plate or flat element has laterally extending arms forming measuring rods in the plane of the plate or flat element.

7. A measuring system according to claim 4, wherein one or more of said transducers are mounted in force-transmitting relationship between said plate or flat element and said carrying member.

8. A measuirng system according to claim 2 or 3, wherein said measuring member has the shape of a tuning fork having two flat legs interconnected along the one rim of each by a yoke.

9. A measuring system according to claim 1 or 3 which can be null-balanced between successive cutting operations.

10. A measuring system according to claim 1 or 3, wherein said transducer is selected from eddy-current transducers, inductive transducers, piezoelectric transducers, capacitive transducers, optical transducers and strain gauges.

11. A system according to claim 3, wherein said means for fine adjustment comprise spindles for fine horizontal and vertical angular adjustment of said mounting table round real axes near or in the plane of the cutting blade.

12. A system according to claim 1 or 3, wherein said transducer is located in said supporting structure at a side therof next the plane of the cutting blade.

13. A measuring system in an annular slicing machine having an annular cutting blade, for detecting the cutting force exerted by said cutting blade onto a workpiece to be sliced during the cutting operation, a mounting table displaceable in a direction transverse to the cutting direction, said workpiece being mounted on said mounting table, means for relative displacement of said mounting table and said cutting blade in the cutting direction for producing the cutting feed, a supporting structure mounted between a carrying portion of the machine and said mounting table, and a measuring transducer disposed for detecting an elastic deformation depending on said cutting force within said supporting structure, further measuring means for detecting the deflection of said cutting blade from its plane and means for controlling the cutting operation in accordance with the measured cutting force and blade deflection.

14. A measuring system according to claim 13, comprising a measuring circuit, at least parts of said measuring circuit being operative alternatively for measurement of the cutting force and of the deflection of the cutting blade respectively.

15. A measuring system according to claim 13 or 14, comprising means for control of the speed of the cutting blade.

16. A measuring system according to claim 2 or 3, wherein said supporting structure is a flat element fixed with one rim thereof to said carrying member, this flat element having appropriate elasticity in the direction of said cutting force, but having high rigidity in a plane perpendicular to the direction of the cutting force.

17. A system according to claim 3, wherein said means for fine adjustment comprise spindles for fine horizontal and vertical angular adjustment of said mounting table round virtual axes near or in the plane of the cutting blade.

18. A measuring system in an annular slicing machine having an annular cutting blade, for detecting the cutting force exerted by said cutting blade onto a workpiece to be sliced during the cutting operation, a mounting table displaceable in a direction transverse to the cutting direction, said workpiece being mounted on said mounting table, said cutting blade in the cutting direction for producing the cutting feed, a supporting structure mounted between a carrying portion of the machine and said mounting table, and a measuring transducer disposed for detecting an elastic deformation depending on said cutting force within said supporting structure, further measuring means for detecting the deflection of said cutting blade from its plane and means for adjusting the cutting operation in accordance with the measured cutting force and blade deflection.

19. A measuring system according to claim 13 or 14, comprising means for control of the speed of the cutting feed.

20. A measuring system according to claim 13 or 14 comprising means for dressing the cutting blade in accordance with the measuring results.

* * * * *